O. J. SALISBURY.
FILTERING APPARATUS.
APPLICATION FILED JAN. 2, 1914. RENEWED NOV. 2, 1914.
1,120,629.
Patented Dec. 8, 1914.
2 SHEETS—SHEET 1.
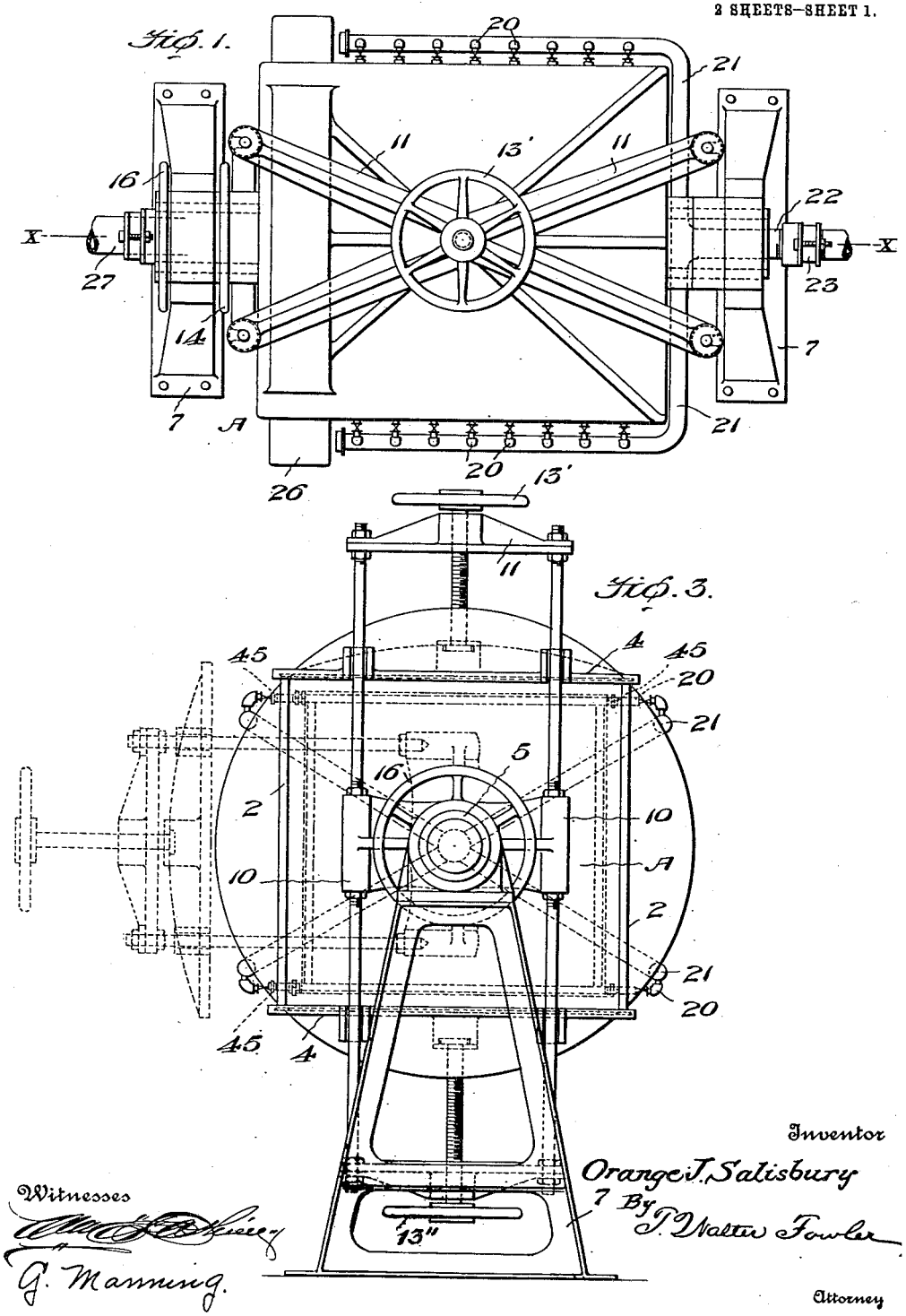
Inventor
Orange J. Salisbury
By T. Walter Fowler
Attorney
Witnesses

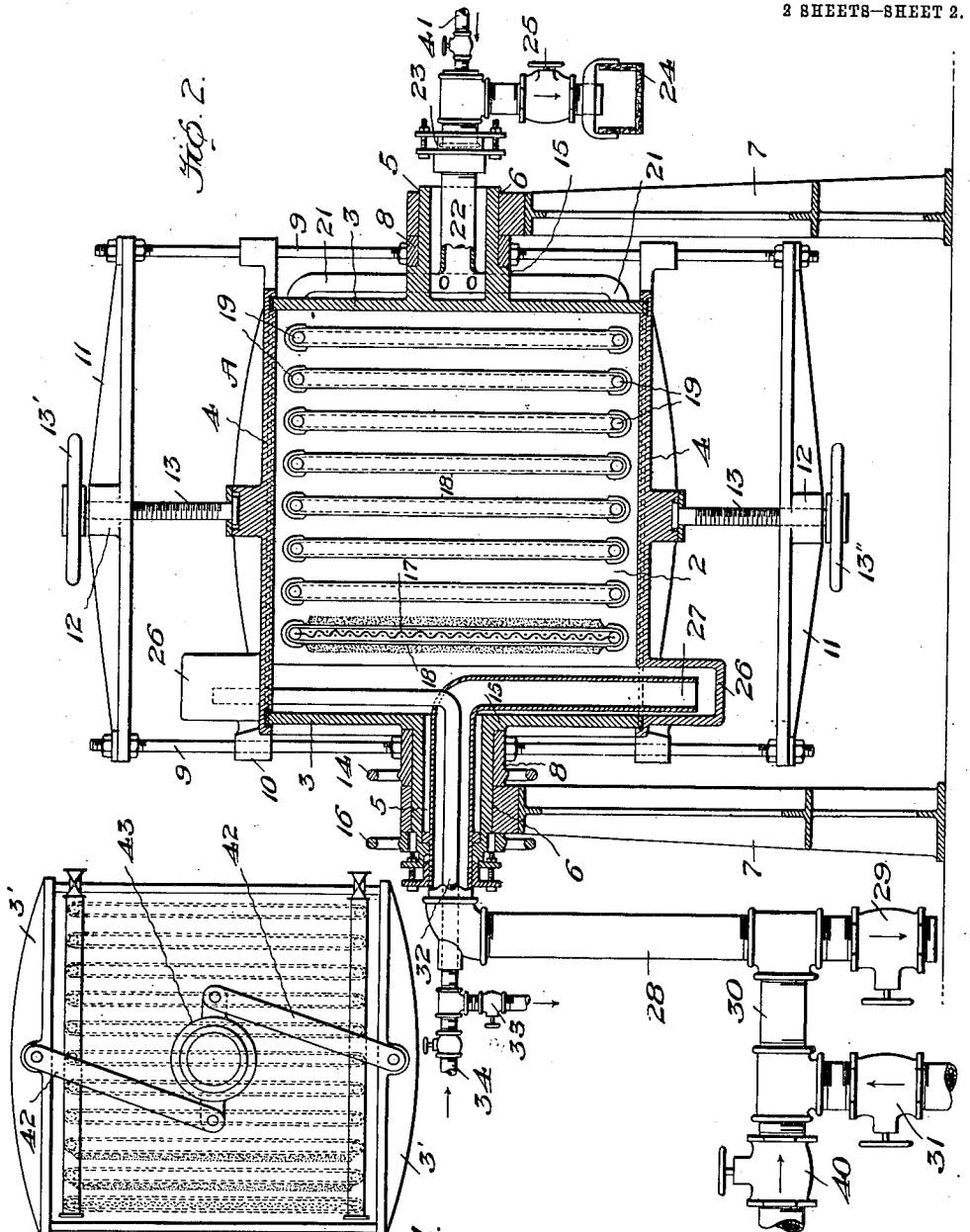

UNITED STATES PATENT OFFICE.

ORANGE J. SALISBURY, OF SALT LAKE CITY, UTAH.

FILTERING APPARATUS.

1,120,629.   Specification of Letters Patent.   Patented Dec. 8, 1914.

Application filed January 2, 1914, Serial No. 810,057. Renewed November 2, 1914. Serial No. 869,971.

*To all whom it may concern:*

Be it known that I, ORANGE J. SALISBURY, a citizen of the United States, residing at Salt Lake City, in the county of Salt Lake and State of Utah, have invented certain new and useful Improvements in Filtering Apparatus, of which the following is a specification.

My invention relates to an apparatus designed especially to separate slimes from which precious metals have been dissolved and the liquid which holds the precious metals in solution.

While the invention has been found particularly useful for metallurgical work, it is not, however, limited to this use, since it may be successfully employed in other fields and substantially wherever the separation of solids from fluid matter is desired. It will be understood, therefore, that the filtering apparatus which I am about to describe, is capable of almost universal use and hence I may employ it in the filtration of mineral-bearing slimes, in filtering saccharine solutions, chemicals, or wherever it is designed to separate a liquid from a solid matter and to discharge the solid matter which has accumulated upon the outside of the filtering medium during the filtering process.

My invention consists of the parts and the constructions, arrangements and combinations of parts which I will hereinafter describe and claim.

In the accompanying drawings forming a part of this specification and in which similar reference characters indicate like parts in the several views; Figure 1 is a top plan view of a filtering apparatus embodying my invention. Fig. 2 is a longitudinal vertical sectional view of the same on the line X—X of Fig. 1. Fig. 3 is an end elevation. Fig. 4 is a modification which I will hereinafter describe.

In the said drawings, A, represents a suitable casing which may have any desired cross sectional shape and which may be made of any desired material and construction suitable for the purposes I have in view, said casing consisting, in the design shown for illustrative purposes, of two permanent sides, 2, two permanent ends, 3, rigid therewith, and two opposite sides, 4, which latter are designed for removal to form a clear passageway through the casing for the unobstructed discharge of the filter cakes or solid matter which may be collected upon the outer surface of the filtering units or elements during the filtering operation, as I will hereinafter describe.

The end heads, 3, of the casing are formed rigidly with hollow projecting trunnions, 5, which are mounted in bearings, 6, formed at the upper portions of suitable standards or uprights, 7, and upon these head portions are rotatably mounted the collars, or hubs, 8, of a head-locking mechanism and which mechanism includes suitable vertical rods, 9, fixed to lateral extensions, 10, of the collars or hub portions and arranged at each end of the casing and projecting above and below the said collars or hub portions, the outer ends of said rods being connected by means of spiders or equivalent plates, 11, the central portions of each of which are pierced and internally threaded to form a nut, 12, in which operates a suitable screw, 13, said screw having its inner end swiveled or otherwise loosely connected to a boss on the central portion of each of the removable sides, 4, of the filter casing; the outer ends of the screws are provided with means by which the screws may be operated to lock the removable sides of the casing tightly in position during the filtering operation, and to unlock these sides and to impart to them an outward substantially radial movement sufficient to enable said sides to clear the ends and permanent sides of the filter casing, whereby the head-locking mechanism with the removable sides of the casing may be revolved as a whole relatively to the balance of the casing; or the permanent parts of the casing may be revolved relatively to the removable sides thereof, as I will hereinafter explain, to facilitate the discharge of the solid matter collected within the casing.

As before stated, the end heads of the casing are provided with extended hollow hubs, 5, and on these hubs between the inner face of the bearings, 6, and a shoulder, 15, formed at the base of the hub, the collars or hubs, 8, which carry the head-locking mechanism are turnably mounted, as shown in Fig. 2, whereby the head-locking mechanism and the casing may be revolved one relatively to the other, or the casing, with the head-mechanism locked thereto in operative position, may be revolved together.

The hollow hubs of one of the end heads is provided with some suitable means as a hand-wheel, 16, by which this hub and its connected parts may be rotated; one of the hollow hubs, or collars of the head-locking mechanism, may also be provided with appropriate means, as a hand-wheel, 14, by which the head-locking mechanism, when unlocked and the removable sides, 4, detached from the end heads, 3, may be rotated independently of the stationary parts of the casing in the manner and for the purpose hereinafter described more in detail.

Within the casing are arranged the filtering elements, which may be of any appropriate type, but which I prefer to construct with an internally woven wire support, or diaphragm, 17, or its equivalent corrugated perforated plate, over the outer sides of which a filtering fabric, 18, of any suitable type may be placed, said woven wire or other diaphragm serving to separate the sides of the filtering fabric and to form a support for the inner wall of the fabric when a difference in pressure is created between the exterior and interior portions of the filtering element. The filtering element described thus includes a hollow filtering frame composed of filtering sides internally reinforced, and the chamber within the elements communicates with the open sides of pipes, 19, arranged at opposite edges of the elements and extending throughout the length of the frame and through the permanent sides of the casing and having their outer ends connected by suitable pipes, 20, with headers, 21, whereby the liquid matter passing through the sides of the filter will pass to the interior of the filter and through said pipes and into the headers, in a manner well known in this art, the header connecting with a pipe, 22, which extends through the hollow hub of one of the end heads of the casing, as shown in Fig. 2, and is provided with a stuffing box, 23, and is finally delivered into a launder or outlet, 24, through the medium of a valve-controlled connection, 25.

The removable sides of the casing are also, preferably, each provided at one end with a depressed portion or well, 26, into which leads the down-turned end of a pipe, 27, which extends through the hollow hub, 5, of the contiguous end head, 3, of the casing and connects with an inlet pipe, 28, having a controlling valve, 29. A pipe, 30, connects with the pipe, 28, and is provided with a controlling valve, 31. It will also be observed from Fig. 2, that a pipe, 32, is arranged within the pipe, 27, and has its inner end extended through said pipe and is turned upwardly so that its upper end is extended into the well or recessed portion, 26, of the upper removable side of the casing, said pipe, 32, having a controlling valve, 33, and having connected to it a branch, 34, which is also valve-controlled.

From the foregoing description, it will be readily understood that the filter casing with its mountings may be rotated at will during the filtering operation, and it is also obvious that after the filtering operation has been performed, the portions of the casing lying opposite to each other and adjacent the outer edges of the filtering elements, and which portions are represented by the removable sides, 4, of the casing, may be detached from the permanent or stationary parts of the casing and rotated in such manner that the filtering elements are completely exposed and accessible.

In Fig. 3, the dotted lines at the left show the unlocked position of the locking mechanism when the same has been rotated substantially 90 degrees about the hubs of the stationary ends of said casing, or in respect to the normal position of the filter casing and accordingly, there is a clear passageway practically through the casing, and the filtering elements are readily accessible.

The filter may be operated in several different ways, depending upon the character of the material to be filtered and the results to be obtained. In the case of a material in which the solids do not show any marked tendency for rapid settlement, the casing, A, may be allowed to remain stationary. The pulp is admitted into the filter casing through the valve-controlled pipe, 28, and through the pipe, 27, and the air displaced during the filling of the tank is permitted to escape through the pipe, 32, and the valve-controlled branch connection, 33. As soon as the casing is completely filled with the material to be filtered, and which operation is indicated by an overflow through the pipe, 33, the valve of this latter pipe is closed. At this point hydraulic pressure begins to operate within the filter and this causes a flow of the filtering material through the filter sides, 18, of the filter and the retention of the solid matter upon the outer surface of these sides and which sides may be composed of any filtering fabric or other material used for the separation of liquids from solids. As the liquid enters the interior of the filtering elements, it passes into the pipes, 19, at the edges thereof and is conveyed from the filters through the fixed sides of the casing and thence into the pipe headers, or manifolds, 21, which converge toward the central hub into the pipe, 22, and the stuffing box, 23, and finally through the valve, 25, and into the launder, 24.

When a cake of requisite thickness has been built upon the sides of the filtering elements, the valve-controlled supply pipe, 28, is closed, and the surplus unfiltered material remaining in the filter casing may be withdrawn by admitting compressed air through the valve-controlled pipe, 2, and which air is conducted through the up-turned end of the pipe, 32, to the upper end of the casing, the air expanding in the casing with the result that the excess unfiltered material remaining in the casing is forced out of said casing through the pipe, 27, and is delivered into the pipe, 28, and out through the valve, 29. This excess unfiltered material may be withdrawn without the use of compressed air simply by opening the valve, 33, in pipe, 32, as this will allow air to enter the casing under atmospheric pressure, while the liquid pulp mixture in the tank is siphoned through pipes, 27 and 28, and delivered through the valve, 29.

When the filter casing is completely drained of unfiltered material, the filter cakes, or the solid matter which has been collected upon the outside of the filtering elements, may be washed for the purpose of removing any remaining values which they contain. To this end, wash water may be supplied through a valve, 40, and thence through the pipes, 30—28, and 27, the air displaced during the filling of the tank with the wash water being withdrawn through the pipe, 32, and discharged through a valve, 33, in the same manner as during the filling of the tank with the material to be filtered, and which material may be in the nature of slimes pulp. When the filter casing is completely filled with the wash water and which will be indicated by an overflow of liquid through the valve, 33, this valve is again closed and the wash solution under pressure is allowed to permeate the cake material and wash the same to any desired extent. The excess wash solution remaining in the casing may now be drained in the same manner as with the unfiltered material, before described.

After the cake has been washed to the desired extent, compressed air may be admitted to the casing through the valve-controlled pipe, 34, for the purpose of drying the cakes by an air-blowing operation, and when the cakes have been dried to the desired extent, the controlling valve of the air admission pipe, 34, may be closed and the valve, 33, of the pipe, 32, may be opened to relieve the air pressure in the casing.

The foregoing description covers the formation of the cake, the separation of the liquid matter from the solids, the washing of the collected solid matter, and the drying of the cake. When these operations have been performed, the apparatus is ready for the disposal of the solid cake material which is supported on and attached to the sides of the filtering elements. To accomplish this, the removable sides, 4, of the filter casing are unlocked by means of the screw mechanism actuated by the hand-wheels, 13' and 13''.

When the removable sides, 4, have been moved to a sufficient distance to permit of their rotation about the now stationary parts of the casing, the hand-wheel 14, is operated to impart rotation to the head-locking mechanism, and the removed sides of the casing, and when the parts are brought to a position substantially as indicated by dotted lines in Fig. 3, a current of air, steam, water, or solution, may be introduced to the interior of the filtering elements through a valve-controlled pipe, 41, which delivers into the pipe, 22, leading to the manifolds, 21, whereby this current of fluid will be delivered through the pipes, 19, at the edges of the filtering elements into the interior of said elements, for the purpose of discharging the cakes built upon the outside of the elements and which are free to fall by gravity outside of the casing, owing to the removal of the side, 4, corresponding to the bottom of the filter casing, it being understood that when the parts have been moved into the dotted position of Fig. 3, as before described, the top and bottom of the casing, represented by the removable sides of said casing connected to and carried by and forming part of the head-locking mechanism, have been turned approximately 90 degrees so that they are now substantially parallel with the permanent sides of said casing.

If the cakes do not discharge readily, they are, because of the top and bottom of the casing being removed, accessible from both top and bottom and scrapers, or a stream of water under pressure, may be used for cleaning the cake material from the sides of the filtering elements.

I am aware that filters have been in use in which a hinged bottom is employed for dumping the cake material, but I know of no instance where complete accessibility is afforded by the removal of both top and bottom of the filter casing, and this is an important feature of my present invention, and is accomplished through the medium of the mechanism before described.

The operation previously described, is in reference to pulp material which has no decided tendency for the settlement of the solid particles during filtration. If this tendency is shown, I am free to revolve the casing with its attached heads during the filtering operation, which instantly brings the heavier particles toward the upper ends of the filtering elements, and creates the most desirable conditions for a circulation of the pulp during filtration.

Another important object of my invention is that the filtering elements may be cleansed by introducing wash solution to the casing, revolving the casing, as a whole, which produces a cleansing effect on the outer sides of the filtering elements. In other words, the filtering apparatus may be used as a washing machine for the purpose of cleaning the filtering elements of attached slimy material. During this washing operation, the valve, 25, is closed, in order that there will be no pressure exerted upon the outside surfaces of the filtering elements, and during the washing of the filters, air, steam, or water, may be forced through the pipe, 41, to assist in opening the pores of the filtering fabric by a pressure exerted against the inner sides of said fabric.

It will be readily understood that the sides of the filter casing which are removable do not necessarily mean the top and bottom of said casing, as it is obvious that the filtering operation may be carried on when these are in any position relative to the position of the openings.

In Fig. 4, I show a mechanism by means of which the two removable parts of the casing and which may represent the heads or ends, 31, of said casing, may be balanced; that is, as the lower detachable portion 3', is locked or unlocked, the upper detachable portion will assume the same relative position. This may be effected by any suitable mechanism, as by the links, 42, or like connections, suitably attached to a rotatable collar, 43, or the like. By such means, only one screw would be necessary to operate the two detachable portions of the casing.

In Fig. 4 I also show the filtering elements placed lengthwise in the filter casing, instead of crosswise. Such a construction permits me to place the filtering elements in a horizontal position, in which case under ordinary conditions, I will use an impervious material on the lower side of the filtering elements in order to confine the cake-building operation to the upper portion of the same, but this may or may not be necessary in all instances.

When using the apparatus of Fig. 4, and when it becomes necessary to discharge the cakes which have been built on the horizontally-disposed filtering elements, I simply remove the outer portions, 3', of the casing, which are always adjacent the outer edges of the filtering elements, and I turn the filter casing to say, a 90 degree angle, which brings the filtering elements into a vertical position, as shown, when the cakes may be readily discharged by gravity.

If it appears desirable to discharge the solid or semi-solid material from the filter without opening the casing, this may be accomplished by rotating the casing and its attached filtering elements, while introducing water or other liquid. The filtered liquid outlets are closed during this operation or a pressure is exerted on the inner sides of the filtering elements by reverse current means. Disintegrated solid material is discharged intermittently during the rotation of the casing, referred to, through the pipes, 27, 28 and valve, 29, or the washing operation may be continuous by introducing a wash liquid through the pipes, 34 and 32, while draining the disintegrated material through the pipes, 27, 28 and valve, 29.

I have also designated in Fig. 3, a test cock, 45, on the branch connections from the filtering elements to the manifold. This is for the purpose of determining which of the filtering elements is faulty if the outflow of filtrate from the header appears cloudy. I have shown outlet connections from the four corners of the filtering elements and these connections are made to that portion of the casing, the sides of which are not removably mounted.

I have heretofore referred to the pipes, 19, for conveying the filtered liquid as being adjacent the outer edges of said elements. It is obvious that I have reference to those edges not adjacent the fixed portion of the casing.

Having thus described my invention what I claim as new and desire to secure by Letters Patent is:—

1. In a filtering apparatus, a casing and filtering elements arranged therein, said casing having opposite portions removable to expose the filtering elements and to provide an open passage through the casing to facilitate the discharge of the deposited material.

2. In a filtering apparatus, a casing and filtering elements arranged therein, said casing having two opposite portions removable to expose the elements edgewise and to give access to the exposed solid matter, and to form a vertical passage open at the bottom for the discharge of solid matter by gravity.

3. In a filtering apparatus, a casing, and filtering elements arranged therein, said casing having two opposite portions removable, said portions extending crosswise the edges of the filtering elements.

4. In a filtering apparatus, a casing and filtering elements arranged therein, said casing having two opposite portions removable, and means for shifting the removed sides relatively to the casing.

5. In a filtering apparatus, a casing and filtering elements arranged therein, said casing having two opposite sides removable and normally extending crosswise the outer edges of the filtering elements, and a revoluble carrier for the removable sides of the casing.

6. In a filtering apparatus, a casing and filtering elements arranged therein, said casing having two opposite sides removable relatively to the remaining portions of the casing, said removable sides normally extending crosswise the outer edges of the filtering elements, and a supporting means for the removable sides of the casing, said casing and supporting means being relatively movable whereby said removable sides may be positioned to one side of said elements to expose a passage through the casing open at two opposite sides to facilitate the discharge by gravity of the solid matter collected on the filtering elements.

7. In a filtering apparatus, a casing, and filtering elements arranged therein and upon which the solid matter is deposited in cake form, said casing having two opposite portions removable, and a carrier for said removable sides for moving the same to one side of said filtering elements.

8. In a filtering apparatus, a casing and filtering elements arranged therein, said casing having two opposite portions removable, said sides normally extending crosswise of opposite outer edges of the filtering elements, means for detachably locking said removable sides in position on the casing, and means for shifting the sides when removed from the casing to expose the elements edgewise and to give access to the deposited solid matter, and to form a vertical passage open at the bottom for the discharge of the solid matter by gravity.

9. In a filtering apparatus, a casing and filtering elements arranged therein, said casing having two opposite sides removable, a revolubly-mounted support having means for locking and unlocking said removable sides with respect to the remaining sides of the casing, said carrier adapted to change the position of the removable sides of the casing relatively to the casing and the filtering elements.

10. In a filtering apparatus, a casing and filtering elements arranged therein, said casing comprising journaled end heads and permanent sides rigid therewith, and two opposite sides detachable from the heads and permanent sides and normally extending crosswise of the outer edges of the filtering elements, and a revolubly-mounted support connected to said removable sides adapted to carry the same, when in their removed position to one side of said filtering elements.

11. In a filtering apparatus, a casing and filtering elements arranged therein, said casing comprising journaled end heads and permanent sides rigid therewith, and two opposite sides detachable from the heads and permanent sides and normally extending crosswise of the outer edges of the filtering elements, and a revolubly-mounted support connected to said removable sides adapted to carry the same, when in their removed position to one side of said filtering elements, and means whereby said casing and its removable sides are revoluble about said journals as an entirety when the removable sides are locked to the permanent sides and ends of the casing.

12. In a filtering apparatus, a casing and filtering elements arranged therein, said casing comprising revolubly-mounted end heads and two opposite sides rigid therewith, and two oppositely placed removable sides, and means whereby the casing and contained filtering elements may be rotated relatively to the removed sides of said casing to fully expose the filtering elements edgewise and to give access to the deposited solid matter and to form a passage open at the bottom for the discharge of said solid matter by gravity.

13. In a filtering apparatus, a casing and filtering elements arranged therein, said casing comprising two opposite, rigidly-connected ends, and two oppositely-disposed removable sides, said ends being provided with trunnions upon which they are revoluble, and means revolubly mounted upon said trunnions having a locking mechanism connected to said removable sides adapted to lock said sides rigidly to the remaining portion of the casing, said casing and its removable sides being revoluble one relatively to the other to permit the filtering elements to be exposed edgewise and to form a passage through the casing parallel with the filtering surface of said elements, whereby the solid matter collected upon said surface is accessible and the discharge of the same by gravity is facilitated.

14. In a filtering apparatus, the combination of a casing and filtering elements arranged therein, said casing comprising two opposite heads having hollow trunnions and two rigid sides connecting said heads, said casing having, also, two opposite removable sides extending crosswise of the outer edges of the filtering elements, a rotary carrier comprising a hub mounted upon each of said trunnions, and parallel rods extending in opposite directions from each of said heads, means connecting the outer ends of the rods at both sides of the casing, said removable sides of the casing having portions slidably guided on said rods, and screws connected to said removable sides of the casing and journaled in said connecting means whereby said sides may be locked to and unlocked from the remainder of the casing.

15. In a filtering apparatus, the combination of a casing and filtering elements arranged therein, said casing comprising two opposite heads having hollow trunnions and two rigid sides connecting said heads, said casing having, also, two opposite removable sides extending crosswise of the outer edges of the filtering elements, a rotary carrier comprising a hub mounted upon each of said trunnions, and parallel rods extending in opposite directions from each of said heads, means connecting the outer ends of the rods at both sides of the casing, said removable sides of the casing having portions slidably guided on said rods, screws connected to said removable sides of the casing and journaled in said connecting means, whereby said sides may be locked to and unlocked from the remainder of the casing, and means whereby the carrier and its connected parts may be rotated relatively to the casing and its contained filtering elements to expose the elements edgewise and to give access to the deposited solid matter.

16. In a filtering apparatus, the combination of a casing and filtering elements arranged therein, said casing comprising heads provided with trunnions upon which they are revoluble and sides rigidly connecting said heads and two oppositely located removable sides, means connecting with said removable sides for moving them outwardly away from the filtering elements, and means for shifting said removable sides relatively to the casing and filtering elements when said sides are unlocked and removed from the remainder of the casing, whereby the filtering elements are exposed edgewise and access is given to the deposited solid matter.

17. In a filtering apparatus, a revolubly mounted casing and filtering elements arranged therein, said casing having two opposite portions removable, a carrier for supporting the removable sides of said casing, means for locking said sides to the casing, and means for rotating the casing and the carrier relatively to expose the edges of the filtering elements and the collected solid matter and to provide a passage for the discharge of the latter.

18. In a filtering apparatus, a casing adapted to contain a solution under pressure, said casing having hollow trunnions at opposite portions upon which it is revolubly supported, and said casing having two of its opposite sides detachable, a pipe extending through one of said trunnions adapted to supply to said casing the material to be filtered, a discharge pipe extending through the opposite trunnion and connected to the interior of the filtering elements and serving as a conductor for the liquid matter which has passed to the interior of the filtering elements, means for supporting the detachable sides of said casing when in their removed position, whereby the casing and the removable sides may be rotated one relatively to the other to expose the elements edgewise and to give access to the deposited solid matter and to facilitate the discharge of the latter by gravity, and means for locking the removable sides in position on the casing, whereby the casing with its removable sides may be rotated as a whole and in the same direction.

19. In a filtering apparatus, the combination of a revolubly-mounted casing having two oppositely placed removable portions, filtering elements within the casing having their edges adjacent the removable portions of the casing, and means for producing a relative movement of the casing and the said removable sides thereof, whereby the filtering elements are exposed edgewise at two opposite sides and an open passage is formed through the casing from side to side.

20. In a filtering apparatus, the combination of a revolubly-mounted casing, having two opposite portions removable, a locking mechanism for said removable portions of the casing, means whereby the casing with the removable portions locked rigidly thereto may be revolved as a whole, means whereby the casing and the removable portions may be relatively revolved, and filtering elements in the casing exposable when the parts of the casing are relatively revolved.

21. A filtering apparatus comprising a casing having oppositely placed separable portions, a filter member within the casing, means for locking the parts of the casing to each other to form a rigid structure and an inclosing pressure chamber for the filter member, and means for moving the separable parts of the casing relatively to the filter member when said parts are in their unlocked position, thereby exposing said filter member.

In testimony whereof I affix my signature in presence of two witnesses.

ORANGE J. SALISBURY.

Witnesses:
R. M. Lowe,
G. F. Summers.